United States Patent Office 2,957,851
Patented Oct. 25, 1960

2,957,851
RESINS OF POLY-SUBSTITUTED BENZENES AND FORMALDEHYDE

Lloyd C. Fetterly, El Cerrito, Calif., assignor to Shell Oil Company, a corporation of Delaware No Drawing. Filed Jan. 23, 1956, Ser. No. 560,876

7 Claims. (Cl. 260—67)

This invention relates to a novel class of resins and processes for preparing the same. More particularly, it relates to novel poly-substituted benzene resins and processes for preparing the same.

It is an object of this invention to provide a novel class of poly-substituted resins. It is another object of this invention to provide a novel class of resins and processes for preparing the same which are resistant to the action of solvents and other liquids. It is another object of this invention to provide a novel class of moldable resins which can be molded into a variety of shapes which exhibit useful and improved electric properties. Other objects will become apparent from the following description.

These and other objects are accomplished by polymers having reoccurring units of the structure:

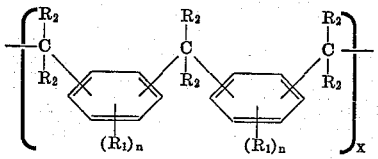

wherein $R_1$ is a saturated aliphatic radical, $R_2$ is selected from hydrogen and the lower alkyl, $n$ is an integer selected from 3 and 4 and $x$ indicates an integer greater than 1. These polymers are referred to herein as poly-substituted benzenes and are taken to mean only those substitutions which are saturated aliphatic radicals and which have from 3 to 4 such substitutions on each benzene ring. The term also includes homopolymers, copolymers and mixed polymers as well. As the $R_1$'s in the above formula may be any saturated aliphatic hydrocarbon substituent, a large variety of different polymers may be prepared. The $R_1$'s may be higher aliphatics such as nonodecyl, pentadecyl, decyl and the like, or they may be lower alkyl such as pentyl, propyl, isopropyl, ethyl, methyl, and the like. If desired the $R_1$'s on the benzene nucleus may be mixtures of such radicals that it will hereinafter appear that such mixtures may be used to produce certain desirable characteristics and properties of the novel resins of this invention.

As the substituents on the benzene ring are capable of such wide variation, it will be found that the chemical and physical properties of the resins will vary considerably depending on the particular substituents. Before considering various and preferred embodiments of the poly-substituted resins, it is desirable to observe some of the fundamental rules that will influence various properties of these resins.

As a general rule, it may be stated that the softening points of the poly-substituted benzenes are higher with increased symmetry of the polymer. From this it follows that they are less soluble and are generally harder materials. The converse is also generally the case; the less symmetrical the polymer, the lower will be its softening point and it will be more soluble and softer. Thus, in selecting the substituents that are to be represented by the $R_1$'s in the above formula, first consideration may be given to the specific physical properties sought in the final products. This consideration in turn depends on the use to which the resin is to be put. Thus, if a hard, high melting molding is desired, the $R_1$'s are selected so as to present a symmetrical configuration wherein the $R_1$'s are of low molecular weight as, for example, methyl. On the other hand, the $R_1$'s will differ if a softer or more soluble resin is desired.

Once it has been determined whether a symmetrical or unsymmetrical polymer is required, the selection of the $R_1$'s can be based on the availability of the reactants. As it happens, those materials are more readily available, or more easily prepared, where $R_1$ is lower alkyl. That being the case, in the above formula it is prefered that the $R_1$'s be selected from lower alkyl radicals of 1 to 4 carbon atoms. Particularly preferred are those of 1 to 2 carbon atoms.

In addition to producing an unsymmetrical product by varying the $R_1$'s the symmetry may be offset by varying their location on the benzene nucleus. This procedure will be better understood by considering the methods by which the products of this invention may be prepared.

In general, the products described above may be prepared by the reaction of a saturated aliphatic poly-substituted benzene having from 3 to 4 such substitutions and an aldehyde in the presence of a catalyst. The reaction may be represented by the equation

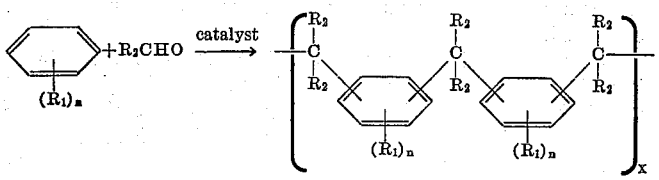

wherein $R_1$, $R_2$, $n$ and $x$ are as previously indicated.

In the reaction shown it is essential that the aldehyde not be present in stoichiometric excess of the poly-substituted benzene. Preferably, a ratio of about 1:1 will produce maximum yields. Considerably lesser quantities of the aldehyde may be used but the yield will be correspondingly lower. Thus, for example, a ratio up to about 1:1.5 will produce the above indicated structures but the yield will be considerably lower as much of the excess poly-substituted benzene will remain unreacted.

If desired, the poly-substituted benzenes may comprise a mixture of such reactants but in all cases the aldehyde must not be present in a quantity greater than the chemical equivalent. The resin product obtained will be unsymmetrical where a mixture of poly-substituted benzenes are reacted with the aldehyde. The aldehyde may be any acyclic saturated aldehyde having from 1 to 8 carbon atoms but it is found that, as a practical matter, formaldehyde is the most feasible in the reaction as the others, i.e., those having from 2 to 8 carbon atoms, are difficult to react with the poly-substituted benzene and require excessively long reaction times at temperatures in the order of 250° C. Even then, yields are low. The following reactants will yield unsymmetrical resins: durene, isodurene and formaldehyde; durene, pseudocumene and formaldehyde; 1,2,3-triethylbenzene, durene and formaldehyde; trimethyl ethyl benzene, prehnitene and formaldehyde; prehnitene, mesitylene and formaldehyde, and the like.

Symmetrical resin products are obtained when the poly-substituted benzene is of one type, as for example, durene and formaldehyde, isodurene and formaldehyde, prehnitene and formaldehyde, mesitylene and formaldehyde, triethyl benzene and formaldehyde, trimethyl ethyl benzene and formaldehyde, pseudocumene and formaldehyde, hemimellitene and formaldehyde, and the like. Such symmetrical resinous products are characterized by considerably higher melting points than the unsymmetrical products described above.

In the above formula it is preferred that $R_2$ be hydrogen although it may be any lower alkyl group up to 8 carbon atoms. It will be found that, as a practical matter, the poly-substituted benzenes, other than the methyl, do not present feasible products because of the difficulty in preparing them in suitable yields. They may be prepared, however, by the reaction of a polyhydrocarbon substituted benzene having 3 or 4 hydrocarbon substituents with a saturated aldehyde having up to 8 carbon atoms in the presence of mineral acid.

The reaction preferably is conducted in the presence of a mutual solvent for the poly-substituted benzene. As the resinous product is formed, it will precipitate and, in general, is difficult to dissolve. Therefore, any non-reactive solvent for the poly-substituted benzene is satisfactory, such as methanol, propanol, ethanol, isopropanol, and the like, may be used. A particular class of satisfactory solvents is the higher linear saturated hydrocarbons of 8 to 13 carbon atoms, or homologues thereof. Also satisfactory are various cyclohydrocarbons such as decalin, cyclooctane and the like. These have the advantage of permitting higher reaction temperatures thus permitting a reduction in the reaction time. It is found that a reaction temperature in the order of 100° C. to 250° C. is desirable as the reaction times will be in the order of 3 to 7 hours, depending upon the particular poly-substituted benzene being reacted. Atmospheric, super-atmospheric, or subatmospheric pressures may be used as desired.

In the case of formaldehyde, a 37% aqueous solution is used as one of the reactants. Continued vigorous agitation during the reaction is required as two phases are often present. Preferably higher aldehydes are also added in the form of solutions in organic solvents.

The rate of reaction is considerably hastened by the use of a catalyst. Such catalysts comprise, for example, sulfuric acid, phosphoric acid, and similarly strong mineral acids.

After the reaction is complete, the product is washed to remove unreacted starting materials and any impurities that may have formed. The choice of the wash liquid will vary depending on the solubility of the product which can be approximated by the degree of its symmetry. As a generalization, unreacted starting material may be removed by washing with any of the common organic solvents as methyl, ethyl, isopropyl and tertiary butyl alcohol, or ethers such as diethyl ether, dioxane and the like, or esters, as methyl or ethyl acetates, or ketones such as acetone or methyl ethyl ketone, and hydrocarbons as benzene and toluene.

Products related to those of this invention may be produced by the reaction of bis-(chloroalkyl)poly-substituted benzenes and poly-substituted benzenes are described in copending application Serial No. 560,864, filed January 23, 1956, now U.S. Patent 2,870,098.

The following examples will illustrate the process of preparing the products of this invention. In the examples, the reactants are expressed in parts by weight.

*Example I*

To a reaction vessel equipped with a reflux condenser, agitator, thermometer and heating and cooling means is charged 100 parts of durene, 55 parts of 37% formalin, 40 parts of methyl alcohol and 92 parts of 96% sulfuric acid. The reaction mass refluxes for 30 minutes whereupon it is cooled to about 25° C. by the addition of water. Two layers are formed. The upper product layer is separated by filtering or decanting and then washed with isopropyl alcohol. The resin product thus produced has a slight grey color having a melting point in excess of 250° C.

*Example II*

The procedure of Example I is repeated except that isodurene is substituted for the durene of Example I. A product similar to that of Example I is produced.

*Example III*

The procedure of Example I is repeated except that 40.2 parts of durene and 46.8 parts of 1,3,5-trimethyl benzene replace the durene of Example I. The product is greyish powder having a melting point of about 175° C.

*Example IV*

The procedure of Example I is repeated except that a chemical equivalent of acetaldehyde replaces the formaldehyde.

The poly-substituted benzenes may be molded into useful parts for the electrical arts as they have improved electrical properties combined with high softening points. The products of this invention may also be applied to insulating tapes for electrical parts.

The conditions under which the products of this invention are molded will vary widely depending on the composition of the particular product and its softening point. This is particularly the case concerning molding temperatures. As a general rule, molding temperatures will be near the softening point of the resin. Where the softening point is too high for economical molding temperatures, or otherwise unsatisfactory, plasticizers may be used. Such plasticizers include the chlorinated biphenyls as the "Arochlors" of the Monsanto Chemical Company. Other conventional chlorinated plasticizers may likewise be used.

Molding pressures range from about 700 p.s.i. to about 3000 p.s.i. Preferably, however, molding pressures range from 1000 to 2000 p.s.i.

If desired, stable pigments may be used as desired to color the molded products. Fillers such as silica, titanium dioxide, mica, acid washed asbestos, and the like, may be used as desired. Fibrous fillers as asbestos impart increased strength to the molded products.

*Example V*

The product of Example I is molded into a small disc 2 inches in diameter and 1/16 inch thick at 250° C. and 2000 p.s.i. It has the following electrical properties at 23° C.:

| Frequency (c.p.s.) | Dielectric Constant | Dielectric Dissipation Factor |
|---|---|---|
| $10^2$ | 2.05 | .0049 |
| $10^3$ | 2.03 | .0033 |
| $10^4$ | 2.02 | .0030 |
| $10^5$ | 2.02 | .0027 |

Comparable electrical properties are exhibited by moldings prepared from the poly-substituted poly benzenes of the other examples.

I claim as my invention:
1. Polymers consisting of reoccuring units of the structure

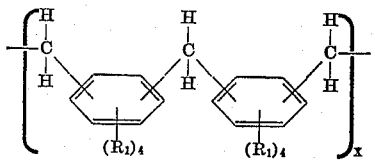

wherein the $R_1$'s are lower aliphatic radicals of 1 to 4 carbon atoms, and $x$ is greater than 1, the polymers having a melting point in excess of about 250° C.

2. Polymers of claim 1 wherein the $R_1$'s are lower alkyl selected from the group consisting of methyl, ethyl and mixtures thereof.
3. Polymers of claim 1 wherein the $R_1$'s are methyl.
4. Polymers of claim 1 wherein the $R_1$'s are ethyl.
5. A process for preparing polymers consisting of reoccurring units of the structure

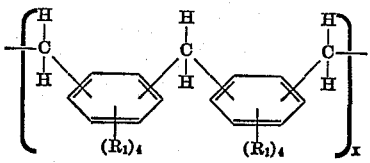

wherein the $R_1$'s are saturated aliphatic radicals of 1 to 4 carbon atoms and $x$ is greater than 1, which comprises reacting an alkyl benzene consisting of a tetra-alkyl benzene of 1 to 4 carbon atoms per alkyl radical and formaldehyde as the sole added reactants, the mole ratio of the formaldehyde to the tetra-alkyl benzene being about 1:1, said reaction being conducted at temperatures ranging from about 100° C. to about 250° C. in the presence of an inert solvent under acid conditions.

6. The process of claim 5 in which $R_1$ is selected from the group consisting of methyl, ethyl and mixtures thereof.
7. The process of claim 5 in which the aliphatic radicals are methyl.

References Cited in the file of this patent

UNITED STATES PATENTS

| | | |
|---|---|---|
| 2,200,763 | Anderson | May 14, 1940 |
| 2,382,184 | Thompson | Aug. 14, 1945 |
| 2,477,538 | Badertscher et al. | July 26, 1949 |
| 2,494,758 | Hartough et al. | Jan. 17, 1950 |
| 2,597,159 | May et al. | May 20, 1952 |

OTHER REFERENCES

Rhoad et al.: JACS, vol. 72, May 1950, pp. 2216–2219.